United States Patent
Kawamura et al.

(10) Patent No.: US 12,278,331 B2
(45) Date of Patent: Apr. 15, 2025

(54) ALL SOLID BATTERY, MANUFACTURING METHOD OF ALL SOLID BATTERY AND SOLID ELECTROLYTE POWDER

(71) Applicant: TAIYO YUDEN CO., LTD., Tokyo (JP)

(72) Inventors: Chie Kawamura, Tokyo (JP); Daigo Ito, Tokyo (JP); Sachie Tomizawa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 253 days.

(21) Appl. No.: 16/862,108

(22) Filed: Apr. 29, 2020

(65) Prior Publication Data

US 2020/0365937 A1 Nov. 19, 2020

(30) Foreign Application Priority Data

May 13, 2019 (JP) .................................. 2019-090901

(51) Int. Cl.
*H01M 10/0562* (2010.01)

(52) U.S. Cl.
CPC .................. *H01M 10/0562* (2013.01); *H01M 2300/0071* (2013.01)

(58) Field of Classification Search
CPC .................. H01M 10/0562; H01M 2300/0071
See application file for complete search history.

(56) References Cited

U.S. PATENT DOCUMENTS

| 2007/0054187 | A1 | 3/2007 | Nuspl et al. ............... 429/218.1 |
| 2012/0231350 | A1* | 9/2012 | Nishida ............ H01M 10/0562 |
| | | | 429/322 |
| 2017/0222260 | A1 | 8/2017 | Hatanai et al. |
| 2018/0301747 | A1* | 10/2018 | Ose .................. H01M 10/0562 |
| 2018/0309165 | A1* | 10/2018 | Yersak ............... H01M 10/058 |
| 2021/0194044 | A1* | 6/2021 | Shin ........................ H01B 1/10 |

FOREIGN PATENT DOCUMENTS

| JP | 2007-511458 A | 5/2007 |
| JP | 2010-105892 A | 5/2010 |
| JP | 2012-243644 A | 12/2012 |
| JP | 2014-067565 A | 4/2014 |

(Continued)

OTHER PUBLICATIONS

Notice of Reasons for Refusal was issued on Mar. 22, 2023 in a counterpart Japanese Patent Application No. 2019-090901.

(Continued)

*Primary Examiner* — Osei K Amponsah
(74) *Attorney, Agent, or Firm* — Stein IP LLC

(57) ABSTRACT

An all solid battery includes: an oxide-based solid electrolyte layer; a first electrode provided on a first main face of the solid electrolyte layer; a second electrode provided on a second main face of the solid electrolyte layer, wherein the solid electrolyte layer is a sintered structure of solid electrolyte powder, wherein the solid electrolyte powder has D10% diameter of 0.05 μm or more and 0.6 μm or less, D50% diameter of 0.08 μm or more and 1.5 μm or less, D90% diameter of 4 μm or less, and a BET value of 3 $m^2/g$ or more and 20 $m^2/g$ or less.

20 Claims, 5 Drawing Sheets

| | BET $m^2/g$ | SEM AVERAGE DIAMETER μm | SIZE DISTRIBUTION | | | CRYSTA- LLITE DIAMETER Å | SURFACE ROUGHNESS Ra nm | SHEET PEELING CHARACTE- RISTIC | IONIC CONDUCTIVITY S/cm | SHORT RATE |
|---|---|---|---|---|---|---|---|---|---|---|
| | | | D10% μm | D50% μm | D90% μm | | | | | |
| EXAMPLE 1 | 3 | 0.6 | 0.6 | 1.5 | 4 | 600 | 80 (○) | ○ | $8.3 \times 10^{-4}$ (○) | 9 (○) |
| EXAMPLE 2 | 20 | 0.07 | 0.05 | 0.08 | 2 | 100 | 25 (○) | ○ | $6.5 \times 10^{-4}$ (○) | 2 (○) |
| EXAMPLE 3 | 10 | 0.1 | 0.2 | 0.3 | 3 | 240 | 40 (○) | ○ | $9.2 \times 10^{-4}$ (○) | − |
| COMPARATIVE EXAMPLE 1 | 2.8 | 0.62 | 0.65 | 1.6 | 4.5 | 630 | 90 (×) | ○ | $9.0 \times 10^{-4}$ (○) | 12 (×) |
| COMPARATIVE EXAMPLE 2 | 25 | 0.04 | 0.3 | 0.2 | 4 | 80 | 70 (○) | × | $8.7 \times 10^{-5}$ (×) | 9 (○) |

(56) References Cited

FOREIGN PATENT DOCUMENTS

| JP | 2017-157305 A | 9/2017 |
|---|---|---|
| JP | 2018-101467 A | 6/2018 |
| WO | WO 2012/063874 A1 | 5/2012 |
| WO | WO 2016/063607 A1 | 4/2016 |
| WO | WO 2018/020990 A1 | 2/2018 |

OTHER PUBLICATIONS

Chinese Office Action dated Dec. 7, 2023, issued by the China National Intellectual Property Administration in corresponding application CN 202010390832.4.
Office Action issued on May 27, 2024, in a counterpart Chinese Patent Application No. 202010390832.4.
Office Action issued on Dec. 2, 2024 in a counterpart Chinese Patent Application No. 202010390832.4.
Final Rejection issued on Jan. 24, 2025 in a counterpart Chinese Patent Application No. 202010390832.4.

* cited by examiner

FIG. 5

| | BET | SEM AVERAGE DIAMETER | SIZE DISTRIBUTION | | | CRYSTA-LLITE DIAMETER | SURFACE ROUGHNESS | SHEET PEELING CHARACTE-RISTIC | IONIC CONDUCTIVITY | SHORT RATE |
|---|---|---|---|---|---|---|---|---|---|---|
| | | | D10% | D50% | D90% | | | | | |
| | m²/g | μm | μm | μm | μm | Å | Ra nm | | S/cm | |
| EXAMPLE 1 | 3 | 0.6 | 0.6 | 1.5 | 4 | 600 | 80 (○) | ○ | $8.3 \times 10^{-4}$ (○) | 9 (○) |
| EXAMPLE 2 | 20 | 0.07 | 0.05 | 0.08 | 2 | 100 | 25 (○) | ○ | $6.5 \times 10^{-4}$ (○) | 2 (○) |
| EXAMPLE 3 | 10 | 0.1 | 0.2 | 0.3 | 3 | 240 | 40 (○) | ○ | $9.2 \times 10^{-4}$ (○) | — |
| COMPARATIVE EXAMPLE 1 | 2.8 | 0.62 | 0.65 | 1.6 | 4.5 | 630 | 90 (×) | ○ | $9.0 \times 10^{-4}$ (○) | 12 (×) |
| COMPARATIVE EXAMPLE 2 | 25 | 0.04 | 0.3 | 0.2 | 4 | 80 | 70 (○) | × | $8.7 \times 10^{-5}$ (×) | 9 (○) |

ALL SOLID BATTERY, MANUFACTURING METHOD OF ALL SOLID BATTERY AND SOLID ELECTROLYTE POWDER

CROSS-REFERENCE TO RELATED APPLICATION

This application is based upon and claims the benefit of priority of the prior Japanese Patent Application No. 2019-090901, filed on May 13, 2019, the entire contents of which are incorporated herein by reference.

FIELD

A certain aspect of the present invention relates to an all solid battery, a manufacturing method of an all solid battery and solid electrolyte powder.

BACKGROUND

All solid batteries having an oxide-based solid electrolyte is expected as safe secondary batteries which do not cause combustion or hazardous gas which is peculiar to organic-based electrolyte or sulfide-based solid electrolyte. From a viewpoint of securing battery capacity, it is favorable that a solid electrolyte layer is thin. It is favorable that a green sheet having a small thickness is fired. From a viewpoint of smoothing the green sheet and reducing the thickness of the green sheet, it is favorable that a particle diameter of powder is reduced. And so, it is thought that the thickness of the solid electrolyte layer is reduced by sintering a solid electrolyte having a small particle diameter (for example, see International Publication No. 2012/063874, International Publication No. 2016/063607 and Japanese Patent Application Publication No. 2018-101467).

SUMMARY OF THE INVENTION

However, when the particle diameter of the powder is excessively small, a ratio of crystal grain boundary in a fired solid electrolyte layer may be high. In this case, ionic conductivity tends to be degraded.

The present invention has a purpose of providing an all solid battery, a manufacturing method of an all solid battery and solid electrolyte powder that are capable of achieving favorable battery capacity and favorable ionic conductivity.

According to an aspect of the present invention, there is provided an all solid battery including: an oxide-based solid electrolyte layer; a first electrode provided on a first main face of the solid electrolyte layer; a second electrode provided on a second main face of the solid electrolyte layer, wherein the solid electrolyte layer is a sintered structure of solid electrolyte powder, wherein the solid electrolyte powder has D10% diameter of 0.05 μm or more and 0.6 μm or less, D50% diameter of 0.08 μm or more and 1.5 μm or less, D90% diameter of 4 μm or less, and a BET value of 3 m$^2$/g or more and 20 m$^2$/g or less.

According to another aspect of the present invention, there is provided a manufacturing method of an all solid battery including: preparing a multilayer structure having a green sheet including oxide-based solid electrolyte powder, a first paste for electrode layer provided on a first main face of the green sheet, a second paste for electrode layer provided on a second main face of the green sheet; and firing the multilayer structure, wherein the solid electrolyte powder has D10% diameter of 0.05 μm or more and 0.6 μm or less, D50% diameter of 0.08 μm or more and 1.5 μm or less, D90% diameter of 4 μm or less, and a BET value of 3 m$^2$/g or more and 20 m$^2$/g or less.

According to another aspect of the present invention, there is provided solid electrolyte powder including: oxide-based solid electrolyte, wherein the solid electrolyte powder has D10% diameter of 0.05 μm or more and 0.6 μm or less, D50% diameter of 0.08 μm or more and 1.5 μm or less, D90% diameter of 4 μm or less, and a BET value of 3 m$^2$/g or more and 20 m$^2$/g or less.

BRIEF DESCRIPTION OF THE DRAWINGS

FIG. 5 illustrates results of examples 1 to 3 and comparative examples 1 and 2.

DETAILED DESCRIPTION

A description will be given of an embodiment with reference to the accompanying drawings.

Embodiment

Figure 1:
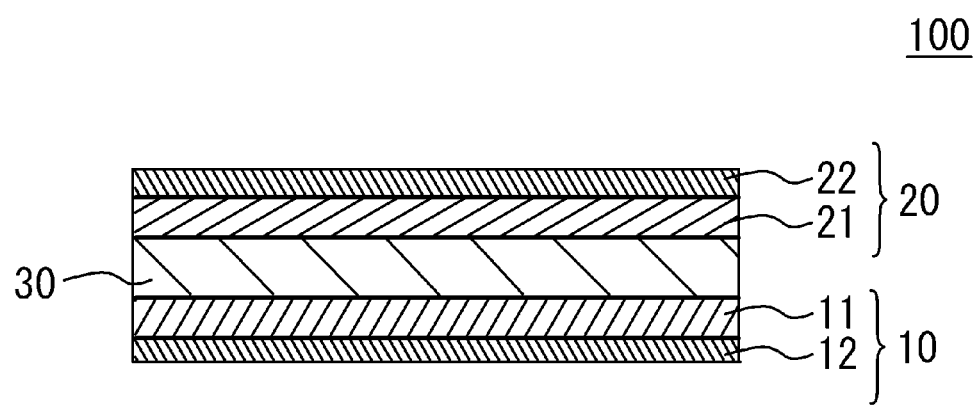
FIG. 1 illustrates a schematic cross section of a basic structure of an all solid battery.

FIG. 1 illustrates a schematic cross section of a basic structure of an all solid battery 100 in accordance with an embodiment. As illustrated in FIG. 1, the all solid battery 100 has a structure in which a first electrode 10 and a second electrode 20 sandwich an oxide-based solid electrolyte layer 30. The first electrode 10 is provided on a first main face of the solid electrolyte layer 30. The first electrode 10 has a structure in which a first electrode layer 11 and a first electric collector layer 12 are stacked. The first electrode layer 11 is on the solid electrolyte layer 30 side. The second electrode 20 is provided on a second main face of the solid electrolyte layer 30. The second electrode 20 has a structure in which a second electrode layer 21 and a second electric collector layer 22 are stacked. The second electrode layer 21 is on the solid electrolyte layer 30 side.

When the all solid battery 100 is used as a secondary battery, one of the first electrode 10 and the second electrode 20 is used as a positive electrode and the other is used as a negative electrode. In the embodiment, as an example, the first electrode 10 is used as a positive electrode, and the second electrode 20 is used as a negative electrode.

At least, the solid electrolyte layer 30 is an oxide-based solid electrolyte. For example, phosphoric acid salt-based electrolyte having a NASICON structure may be used for the solid electrolyte layer 30. The phosphoric acid salt-based solid electrolyte having the NASICON structure has a high conductivity and is stable in normal atmosphere. The phosphoric acid salt-based solid electrolyte is, for example, such as a salt of phosphoric acid including lithium. The phosphoric acid salt is not limited. For example, the phosphoric acid salt is such as composite salt of phosphoric acid with Ti (for example LiTi$_2$(PO$_4$)$_3$). Alternatively, at least a part of Ti may be replaced with a transition metal of which a valence is four, such as Ge, Sn, Hf, or Zr. In order to increase an amount of Li, a part of Ti may be replaced with a transition metal of which a valence is three, such as Al, Ga, In, Y or La. In concrete, the phosphoric acid salt including lithium and having the NASICON structure is $Li_{1+x}Al_xGe_{2-x}(PO_4)_3$, $Li_{1+x}Al_xZr_{2-x}(PO_4)_3$, $Li_{1+x}Al_xT_{2-x}(PO_4)_3$ or the like. For example, it is preferable that Li—Al—Ge—$PO_4$-based material, to which a transition metal included in the phosphoric acid salt having the olivine type crystal structure included in the first electrode layer 11 and the second electrode layer 21 is added in advance, is used. For example, when the first electrode layer 11 and the second electrode layer 21 include phosphoric acid salt including Co and Li, it is preferable that the solid electrolyte layer 30 includes Li—Al—Ge—$PO_4$-based material to which Co is added in advance. In this case, it is possible to suppress solving of the transition metal included in the electrode active material into the electrolyte. When the first electrode layer 11 and the second electrode layer 21 include phosphoric acid salt including Li and a transition metal other than Co, it is preferable that the solid electrolyte layer 30 includes Li—Al—Ge—$PO_4$-based material in which the transition metal is added in advance.

At least, the first electrode layer 11 used as a positive electrode includes a material having an olivine type crystal structure, as an electrode active material. It is preferable that the second electrode layer 21 also includes the electrode active material. The electrode active material is such as phosphoric acid salt including a transition metal and lithium. The olivine type crystal structure is a crystal of natural olivine. It is possible to identify the olivine type crystal structure, by using X-ray diffraction.

For example, $LiCoPO_4$ including Co may be used as a typical example of the electrode active material having the olivine type crystal structure. Other salts of phosphoric acid, in which Co acting as a transition metal is replaced to another transition metal in the above-mentioned chemical formula, may be used. A ratio of Li or $PO_4$ may fluctuate in accordance with a valence. It is preferable that Co, Mn, Fe, Ni or the like is used as the transition metal.

The electrode active material having the olivine type crystal structure acts as a positive electrode active material in the first electrode layer 11 acting as a positive electrode. For example, when only the first electrode layer 11 includes the electrode active material having the olivine type crystal structure, the electrode active material acts as the positive electrode active material. When the second electrode layer 21 also includes an electrode active material having the olivine type crystal structure, discharge capacity may increase and an operation voltage may increase because of electric discharge, in the second electrode layer 21 acting as a negative electrode. The function mechanism is not completely clear. However, the mechanism may be caused by partial solid-phase formation together with the negative electrode active material.

When both the first electrode layer 11 and the second electrode layer 21 include an electrode active material having the olivine type crystal structure, the electrode active material of each of the first electrode layer 11 and the second electrode layer 21 may have a common transition metal. Alternatively, the a transition metal of the electrode active material of the first electrode layer 11 may be different from that of the second electrode layer 21. The first electrode layer 11 and the second electrode layer 21 may have only single type of transition metal. The first electrode layer 11 and the second electrode layer 21 may have two or more types of transition metal. It is preferable that the first electrode layer 11 and the second electrode layer 21 have a common transition metal. It is more preferable that the electrode active materials of the both electrode layers have the same chemical composition. When the first electrode layer 11 and the second electrode layer 21 have a common transition metal or a common electrode active material of the same composition, similarity between the compositions of the both electrode layers increases. Therefore, even if terminals of the all solid battery 100 are connected in a positive/negative reversed state, the all solid battery 100 can be actually used without malfunction, in accordance with the usage purpose.

The second electrode layer 21 may include known material as the negative electrode active material. When only one of the electrode layers includes the negative electrode active material, it is clarified that the one of the electrode layers acts as a negative electrode and the other acts as a positive electrode. When only one of the electrode layers includes the negative electrode active material, it is preferable that the one of the electrode layers is the second electrode layer 21. Both of the electrode layers may include the known material as the negative electrode active material. Conventional technology of secondary batteries may be applied to the negative electrode active material. For example, titanium oxide, lithium-titanium complex oxide, lithium-titanium complex salt of phosphoric acid salt, a carbon, a vanadium lithium phosphate.

In the forming process of the first electrode layer 11 and the second electrode layer 21, moreover, oxide-based solid electrolyte material or a conductive material (conductive auxiliary agent) such as a carbon or a metal may be added. When the material is evenly dispersed into water or organic solution together with binder or plasticizer, paste for electrode layer is obtained. Pd, Ni, Cu, or Fe, or an alloy thereof may be used as a metal of the conductive auxiliary agent.

The first electric collector layer 12 and the second electric collector layer 22 are made of a conductive material.

Figure 2:
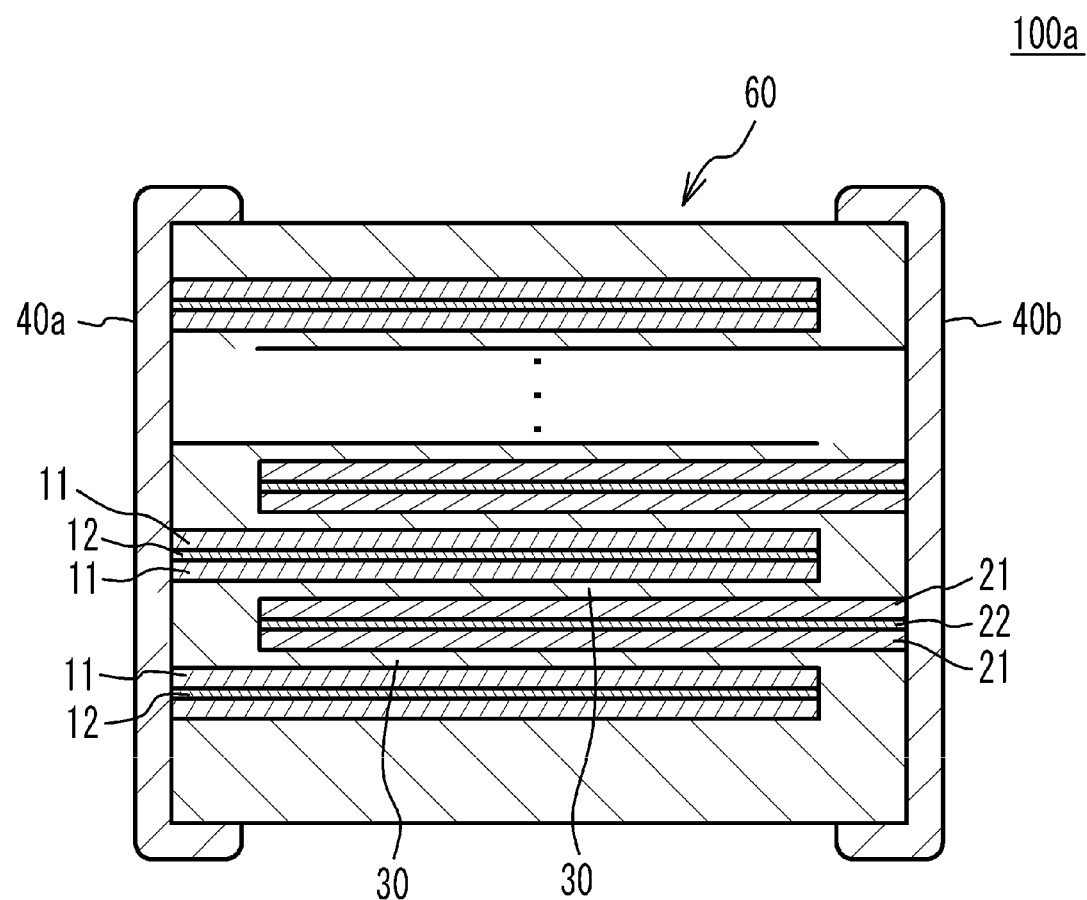
FIG. 2 illustrates a schematic cross section of another all solid battery.

FIG. 2 illustrates a schematic cross section of an all solid battery 100a in which a plurality of cell units are stacked. The all solid battery 100a has a multilayer chip 60 having a rectangular parallelepiped shape, a first external electrode 40a provided on a first edge face of the multilayer chip 60, and a second external electrode 40b provided on a second edge face facing with the first edge face.

In four faces other than the two end faces of the multilayer chip 60, two faces other than an upper face and a lower face of the multilayer chip 60 in a stacking direction are referred to as side faces. The first external electrodes 40a and the second external electrode 40b extend to the upper face, the lower face and the two side faces of the multilayer chip 60. However, the first external electrode 40a and the second external electrode 40b are spaced from each other.

In the following description, the same numeral is added to each member that has the same composition range, the same thickness range and the same particle distribution range as that of the all solid battery 100. And, a detail explanation of the same member is omitted.

In the all solid battery 100a, each of the first electric collector layers 12 and each of the second electric collector layers 22 are alternately stacked. Edges of the first electric collector layers 12 are exposed to the first edge face of the multilayer chip 60 but are not exposed to the second edge face of the multilayer chip 60. Edges of the second electric collector layers 22 are exposed to the second edge face of the multilayer chip 60 but are not exposed to the first edge face. Thus, each of the first electric collector layers 12 and each of the second electric collector layers 22 are alternately conducted to the first external electrode 40a and the second external electrode 40b.

The first electrode layer 11 is stacked on the first electric collector layer 12. The solid electrolyte layer 30 is stacked on the first electrode layer 11. The solid electrolyte layer 30 extends from the first external electrode 40a to the second external electrode 40b. The second electrode layer 21 is stacked on the solid electrolyte layer 30. The second electric collector layer 22 is stacked on the second electrode layer 21. Another second electrode layer 21 is stacked on the second electric collector layer 22. Another solid electrolyte layer 30 is stacked on the second electrode layer 21. The solid electrolyte layer 30 extends from the first external electrode 40a to the second external electrode 40b. The first electrode layer 11 is stacked on the solid electrolyte layer 30. In the all solid battery 100a, the stack units are repeatedly stacked. Therefore, the all solid battery 100a has a structure in which a plurality of cell units are stacked.

From a viewpoint of securing battery capacity of the all solid battery 100a, it is preferable that the solid electrolyte layer 30 is thin. For example, it is preferable that an average thickness of the solid electrolyte layer 30 is 10 μm or less. It is more preferable that the average thickness is 5 μm or less. In this case, it is preferable that a green sheet having a small thickness is fired. From a viewpoint of reducing the thickness of a smoothed green sheet, it is preferable that a particle diameter of powder is small. However, when the particle diameter of solid electrolyte powder is excessively small, a ratio of crystal grain boundary in the fired solid electrolyte layer 30 is high. In this case, ion conductivity may be degraded.

Figure 3:
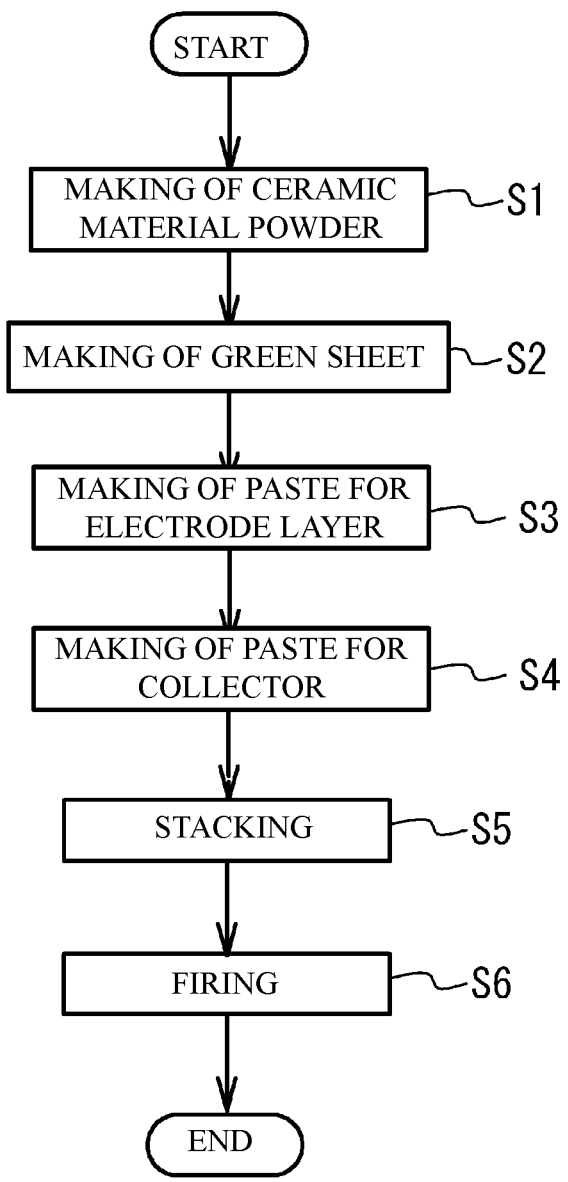
FIG. 3 illustrates a flowchart of a manufacturing method of an all solid battery.

And so, a description will be given of ceramic material powder, and a manufacturing method of the all solid battery that are capable of achieving securing the battery capacity and the ion conductivity. FIG. 3 illustrates a flowchart of the manufacturing method of the all solid battery 100a.

(Making process of ceramic material powder) Ceramic material powder including the phosphoric acid salt-based solid electrolyte is made. For example, it is possible to make the phosphoric acid-based solid electrolyte powder, by mixing raw material and additives and using solid phase synthesis method or the like. The resulting powder is subjected to dry grinding. Thus, a grain diameter of the resulting power is adjusted to a desired one. It is therefore possible to make the ceramic material powder including the solid electrolyte powder. The ceramic material powder may include necessary additives other than the solid electrolyte powder.

In the ceramic material powder of the embodiment, the solid electrolyte powder has D10% particle diameter of 0.05 μm or more and 0.6 μm or less, D50% particle diameter of 0.08 μm or more and 1.5 μm or less, and D90% particle diameter of 4 μm or less. A BET value of the solid electrolyte powder is 3 $m^2/g$ or more and 20 $m^2/g$ or less. It may be possible to measure the BET value by a BET one point method by using Macsorb HM model-1200 series, nitrogen gas and nitrogen-helium (30 mol %) mixed gas. An amount of sample is weighed so that an actual measured value is 1 $m^2$ to 50 $m^2$. The sample is put in a glass cell. An adsorbed water is removed from the sample by heating the sample for 15 minutes at 200 degrees C. while nitrogen gas is flown through the sample. After that, it is possible to use the resulting sample for the BET measurement. It is possible to measure the D10% diameter, the D50% diameter, and the D90% diameter by using a laser diffraction particle size analyzer.

(Making process of green sheet) The resulting ceramic material powder is evenly dispersed into aqueous solvent or organic solvent together with a binding agent, a dispersing agent, a plasticizer and so on. The resulting ceramic material power is subjected wet crushing. And solid electrolyte slurry having a desired particle diameter is obtained. In this case, a bead mill, a wet jet mill, a kneader, a high pressure homogenizer or the like may be used. It is preferable that the bead mill is used because adjusting of particle size distribution and dispersion are performed at the same time. A binder is added to the resulting solid electrolyte slurry. Thus, solid electrolyte paste is obtained. The solid electrolyte paste is painted. Thus, a green sheet is obtained. The painting method is not limited. For example, a slot die method, a reverse coat method, a gravure coat method, a bar coat method, a doctor blade method or the like may be used. It is possible to measure the particle size distribution after the wet-crushing, by using a laser diffraction measurement device using a laser diffraction scattering method. In the wet-crushing, excessive energy is not used. Thus, the solid electrolyte powder has the D10% diameter of 0.05 μm or more and 0.6 μm or less, the D50% diameter of 0.08 μm or more and 1.5 μm or less, the D90% diameter of 4 μm or less, and the BET value of 3 $m^2/g$ or more and 20 $m^2/g$ or less.

(Making process of paste for electrode layer) Next, paste for electrode layer is made in order to make the first electrode layer 11 and the second electrode layer 21. For example, a conductive auxiliary agent, an active material, a solid electrolyte material, a binder, a plasticizer and so on are evenly dispersed into water or organic solvent. Thus, paste for electrode layer is obtained. The above-mentioned solid electrolyte paste may be used as the solid electrolyte material. Pd, Ni, Cu, Fe, an alloy including two or more of them, or a carbon material may be used as the conductive auxiliary agent. When the composition of the first electrode layer 11 is different from that of the second electrode layer 21, paste for electrode layer used for the first electrode layer 11 and another paste for electrode layer used for the second electrode layer 21 may be individually made.

(Making process of paste for electric collector) Next, paste for electric collector is made in order to make the first electric collector layer 12 and the second electric collector layer 22. It is possible to make the paste for electric collector, by evenly dispersing powder of Pd, carbon black, board-shaped graphite carbon, a binder, dispersant, plasticizer and so on into water or organic solvent.

Figure 4:
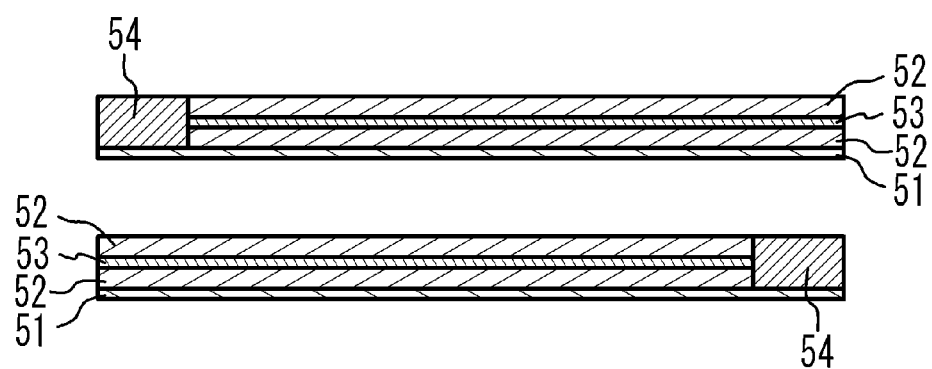
FIG. 4 illustrates a stacking process.

(Stacking process) Paste 52 for electrode layer is printed on one face of a green sheet 51 as illustrated in FIG. 4. Paste 53 for electric collector is printed on the paste 52 for electrode layer. And, another paste 52 for electrode layer is printed on the paste 53 for electric collector. A reverse pattern 54 is printed on a part of the green sheet 51 where neither the paste 52 for electrode layer nor the paste 53 for electric collector is printed. A material of the reverse pattern 54 may be the same as that of the green sheet 51. The green sheets 51 after printing are stacked so that each of the green sheets 51 is alternately shifted to each other. Thus, a multilayer structure is obtained. In this case, in the multilayer structure, a pair of the paste 52 for electrode layer and the paste 53 for electric collector are alternately exposed to the two edge faces of the multilayer structure.

(Firing process) Next, the obtained multilayer structure is fired. In the firing process, it is preferable that a maximum temperature is 400 degrees C. to 1000 degrees C. in an oxidizing atmosphere or non-oxidizing atmosphere. It is more preferable that that maximum temperature is 500 degrees C. to 900 degrees C. In order to sufficiently remove the binder until the maximum temperature, a process for keeping a temperature lower than the maximum temperature in an oxidizing atmosphere may be performed. It is preferable that the firing is performed in the lowest possible temperature, from a viewpoint of reduction of the process cost. After the firing, a re-oxidizing process may be performed. In this manner, the multilayer chip 60 is manufactured.

(Forming process of external electrode) After that, metal paste is applied to the two end faces of the multilayer chip 60. And, the metal paste is fired. Thus, the first external electrode 40a and the second external electrode 40b are formed. Alternatively, the multilayer chip 60 may be put in a dedicated tool so that the first external electrode 40a is spaced from the second external electrode 40b on the upper face, the lower face and the two side faces connected to the two end faces. And, electrodes may be formed by a sputtering. The first external electrode 40a and the second external electrode 40b may be formed by plating on the formed electrodes.

In the manufacturing method of the embodiment, the solid electrolyte powder of the ceramic material powder has the BET value of 3 m$^2$/g or more and 20 m$_2$/g or less. In this case, the particle diameter of the solid electrolyte powder is small. The solid electrolyte powder has the D10% diameter of 0.05 μm or more and 0.6 μm or less, the D50% diameter of 0.08 μm or more and 1.5 μm or less, and the D90% diameter of 4 μm or less. In this case, it is possible to suppress contamination of powder having excessively large size. It is therefore possible to smooth the green sheet, reduce the thickness of the green sheet and reduce the thickness of the solid electrolyte layer 30 after the firing. And, the all solid battery 100 has a multilayer structure of the solid electrolyte layer 30. Thereby, the battery capacity is improved. The particle diameter of the solid electrolyte is not excessively small. In this case, it is possible to reduce the ratio of the crystal grain boundary of the solid electrolyte layer 30 after the firing. And, degradation of the ionic conductivity can be suppressed. When contamination of powder having excessively small size is suppressed, it is possible to suppress influence on handling of the green sheet (peeling characteristic, strength and so on). When the green sheet is smoothed, short can be suppressed.

It is preferable that an average particle diameter of the solid electrolyte powder is 0.05 μm or more and 0.6 μm or less. In this case, it is possible to reduce the particle diameter of the solid electrolyte powder. And the battery capacity is improved. The particle diameter of the solid electrolyte powder is not excessively small. It is therefore possible to suppress the degradation of the ionic conductivity. It is possible to measure the average particle diameter by adjusting the magnification of a scanning electron microscope (SEM) so that a single image includes 80 to 150 numbers of crystal grains, taking a plurality of images so that 400 numbers or more of crystal grains are included, and measuring Feret diameters of all crystal grains in the images.

The solid electrolyte powder generally has a polycrystalline structure. Therefore, when the crystal grain diameter of the solid electrolyte powder is large, the crystalline structure of the solid electrolyte is close to single crystal structure. Therefore, the solid electrolyte powder has an advantage in ionic conductivity. And so, it is preferable that the crystal grain diameter of the solid electrolyte powder is 100 Å or more. It is more preferable that the crystal grain diameter is 300 Å or more and 600 Å or less.

EXAMPLES

The all solid batteries in accordance with the embodiment were made and the property was measured.

Example 1

Li$_2$CO$_3$, Al$_2$O$_3$, GeO$_2$ and MAP (dihydrogen phosphate ammonium), were mixed by a dry bead mill. The resulting powder was heated for 1 hour at 400 degrees C. After that, the resulting powder was crushed by a bead mill in dispersion medium of ethanol so that the D50% diameter measured by a laser diffraction becomes 1 μm. After that, the resulting powder was calcined at 700 degrees C. Thus, LAGP powder (Li$_{1.5}$Al$_{0.5}$Ge$_{1.5}$(PO$_4$)$_3$) was obtained.

The BET value (specific surface area) was 3 m$^2$/g. The SEM average particle diameter was 0.6 μm. The SEM average particle diameter was measured by adjusting the magnification of a scanning electron microscope (SEM) so that a single image includes 80 to 150 numbers of crystal grains, taking a plurality of images so that 400 numbers or more of crystal grains are included, and measuring Feret diameters of all crystal grains in the images.

Sample of 0.05 g was dispersed in ultrasonic bath of ethanol of 50 mL for 3 minutes. Particle size distribution of the sample was measured by using LA950 laser diffraction device made by HORIBA, Ltd. and using ethanol for dispersion medium for measurement. The D10% diameter was 0.6 μm. The D50% diameter was 1.5 μm. The D90% diameter was 4 μm. Profile of the sample was measured by powder XRD measuring method. In the powder XRD measuring method, Ultima IV made by Rigaku corporation was used. Continuous scanning was performed. X-Ray 40 kV/40 mA was used. Divergence slit was 1°. Vertical divergence limitation slit was 10 mm. Scattering slit was opened. Photoreception slit was opened. Monochrome photoreception slit was not used. Step was 0.02°. Speed was 5°/sec. Crystallite diameter was measured by WPPF fitting. The measured crystallite diameter was 600 Å.

Example 2

Sample after the thermal process of 400 degrees C. was dispersed in ethanol. After the dispersion, the D50% diameter of the sample was 0.06 μm. Other conditions were the same as those of the example 1. The BET value was 20 m$^2$/g. The SEM average particle diameter was 0.07 μm. The D10% diameter was 0.05 μm. The D50% diameter was 0.08 μm. D90% diameter was 2 μm. The crystallite diameter was 100 Å.

Example 3

TiO$_2$ was used instead of GeO$_2$. And, the mixing was performed so that a composition of Li$_{1.3}$Al$_{0.3}$Ti$_{1.7}$(PO$_4$)$_3$ was achieved. Sample after the thermal process of 400 degrees C. was dispersed in ethanol. After the dispersion, the D50% diameter of the sample was 0.08 μm. Other conditions were the same as those of the example 1. The BET value was 10 m$^2$/g. The SEM average particle diameter was 0.1 μm. The D10% diameter was 0.2 μm. The D50% diameter was 0.3 μm. The D90% diameter was 3 μm. The crystallite diameter was 240 Å.

Comparative Example 1

Sample after the thermal process of 400 degrees C. was dispersed in ethanol. After the dispersion, the D50% diameter of the sample was 1.5 μm. Other conditions were the same as those of the example 1. The BET value was 2.8 m$^2$/g. The SEM average particle diameter was 0.62 μm. The D10% diameter was 0.65 μm. The D50% diameter was 1.6 μm. D90% diameter was 4.5 μm. The crystallite diameter was 630 Å.

Comparative Example 2

Sample after the thermal process of 400 degrees C. was dispersed in ethanol. After the dispersion, the D50% diameter of the sample was 0.04 μm. Other conditions were the same as those of the example 1. The BET value was 25 m²/g. The SEM average particle diameter was 0.04 μm. The D10% diameter was 0.3 μm. The D50% diameter was 0.2 μm. D90% diameter was 4 μm. The crystallite diameter was 80 Å.

(Analysis 1) With respect to the examples 1 to 3 and the comparative examples 1 and 2, the resulting solid electrolyte powder was wet-crushed (dispersion medium: mixed solution of ethanol and toluene). A binder was added to the resulting solid electrolyte powder. Thus, a green sheet having a thickness of 2 μm was formed on a PET film. The surface roughness (Ra) of the green sheet was measured. When the surface roughness Ra of the green sheet was 80 nm or less, the surface roughness was determined as good "◯". When the surface roughness Ra was more than 80 nm, the surface roughness was determined as bad "X". It was confirmed whether the green sheet was peeled without any problem. When the green sheet was peeled without any problem, the peeling characteristic was determined as good "◯". When the green sheet was not peeled, the peeling characteristic was determined as bad "X". 20 numbers of the green sheets were stacked. The stacked structure was heated and pressed at 80 degrees C. Thus, a disk compact having a diameter φ of 1.5 cm was formed. The disc compact was heated to 700 degrees C. or more. And a sintered structure was made. Both faces of the sintered structure were subjected to Au sputtering. Impedance of the sintered structure was measured at a room temperature. Ionic conductivity of Li was evaluated. When the ionic conductivity was $10^{-4}$ S/cm or more, the ionic conductivity was determined as good "◯". When the ionic conductivity was less than $10^{-4}$ S/cm, the ionic conductivity was determined as bad "X". FIG. 5 illustrates the results.

In the examples 1 to 3, the surface roughness Ra was determined as good "◯", the sheet peeling characteristic was determined as good "◯", and the ionic conductivity was determined as good "◯". It is thought that favorable sheet smoothness, favorable peeling characteristic and favorable ionic conductivity were achieved, because the BET value of the solid electrolyte powder was 3 m²/g or more and 20 m²/g or less, the D10% diameter was 0.05 μm or more and 0.6 μm or less, the D50% diameter was 0.08 μm or more and 1.5 μm or less, and the D90% diameter was 4 μm or less.

On the other hand, in the comparative example 1, the surface roughness was more than 80 nm. Therefore, the surface roughness was determined as bad "X". It is thought that this was because the BET value of the solid electrolyte powder was less than 3 m²/g, the D10% diameter was more than 0.6 μm, the D50% diameter was more than 1.5 μm, the D90% diameter was more than 4 μm, and the particle diameter was excessively large. In the comparative example 2, the sheet peeling characteristic was determined as bad "X". It is thought that this was because the BET value was more than 20 m²/g, and the particle diameter was excessively small.

(Analysis 2) With respect to each of the examples 1 and 2 and the comparative examples 1 and 2, a stack cell was made by using the green sheet. Paste for electrode layer having a thickness of 2 μm was printed on the green sheet, by using a predetermined pattern screen. Pd paste having a thickness of 0.7 μm acting as paste for electric collector was printed on the paste for electrode layer. Moreover, another paste for electrode layer having a thickness of 2 μm was printed on the paste for electric collector. 11 numbers of the green sheet after the printing were stacked so that electrode layers are alternately exposed to two end faces of the stacked structure. After that, a plurality of the green sheet without printing having an average total thickness of 30 μm and acting as a cover layer was provided on an upper face and a lower face of the stacked structure. The cover sheets were crimped to the stacked structure by heating pressurizing. The resulting structure was cut into chips having a square shape of 8 mm×8 mm by a dicer. 100 numbers of the chip were subjected to degreasing by a thermal treatment of 300 degrees C. to 500 degrees C. After that, the chips were subjected to a thermal treatment of 900 degrees C. or less. Thus, sintered chips were made. Two end faces of the sintered chips to which the electrode layers were exposed was coated with Ag paste. Thus, a pair of external electrodes were formed. A short rate was calculated from the number of chip in which short occurred. When the short rate was 10% or less, the short rate was determined as good "◯". When the short rate was more than 10%, the short rate was determined as bad "X".

In the examples 1 and 2 and the comparative example 2, the short rate was determined as good "◯". It is thought that this was because the surface roughness (Ra) of the green sheet was 80 nm or less. On the other hand, in the comparative example 2, the short rate was determined as bad "X". It is thought that this was because the surface roughness (Ra) of the green sheet was more than 80 nm, and unevenness degree was large.

Although the embodiments of the present invention have been described in detail, it is to be understood that the various change, substitutions, and alterations could be made hereto without departing from the spirit and scope of the invention.

What is claimed is:

1. An all solid battery comprising:
   an oxide-based solid electrolyte layer;
   a first electrode provided on a first main face of the solid electrolyte layer;
   a second electrode provided on a second main face of the solid electrolyte layer,
   wherein the solid electrolyte layer is a sintered structure of solid electrolyte powder,
   wherein the solid electrolyte powder is $Li_{1+x}Al_xGe_{2-x}(PO_4)_3$, $Li_{1+x}Al_xZr_{2-x}(PO_4)_3$ or $Li_{1+x}Al_xTi_{2-x}(PO_4)_3$, and
   wherein the solid electrolyte powder has D10% diameter of 0.05 μm or more and 0.6 μm or less, D50% diameter of 0.08 μm or more and 1.5 μm or less, D90% diameter of 2 μm or more and 4 μm or less, and a BET value of 3 m²/g or more and 20 m²/g or less.

2. The all solid battery as claimed in claim 1, wherein an average particle diameter of the solid electrolyte powder is 0.05 μm or more and 0.6 μm or less.

3. The all solid battery as claimed in claim 1, wherein the solid electrolyte powder is phosphoric acid-based solid electrolyte powder.

4. The all solid battery as claimed in claim 3, wherein the phosphoric acid-based electrolyte powder has a NASICON structure.

5. A manufacturing method of an all solid battery comprising:
   preparing a multilayer structure having a green sheet including oxide-based solid electrolyte powder, a first paste for electrode layer provided on a first main face of the green sheet, a second paste for electrode layer provided on a second main face of the green sheet; and firing the multilayer structure, wherein the solid electrolyte powder is $Li_{1+x}Al_xGe_{2-x}(PO_4)_3$, $Li_{1+x}Al_xZr_{2-x}(PO_4)_3$ or $Li_{1+x}Al_xTi_{2-x}(PO_4)_3$, and wherein the solid electrolyte powder has D10% diameter of 0.05 μm or more and 0.6 μm or less, D50% diameter of 0.08 μm or more and 1.5 μm or less, D90% diameter of 2 μm or more and 4 μm or less, and a BET value of 3 m$^2$/g or more and 20 m$^2$/g or less.

6. The method as claimed in claim 5, wherein an average particle diameter of the solid electrolyte powder is 0.05 μm or more and 0.6 μm or less.

7. The method as claimed in claim 5, wherein the solid electrolyte powder is phosphoric acid-based solid electrolyte powder.

8. The method as claimed in claim 7, wherein the phosphoric acid-based electrolyte powder has a NASICON structure.

9. Solid electrolyte powder comprising:
oxide-based solid electrolyte,
wherein the oxide-based solid electrolyte is $Li_{1+x}Al_xGe_{2-x}(PO_4)_3$, $Li_{1+x}Al_xZr_{2-x}(PO_4)_3$ or $Li_{1+x}Al_xTi_{2-x}(PO_4)_3$, and
wherein the solid electrolyte powder has D10% diameter of 0.05 μm or more and 0.6 μm or less, D50% diameter of 0.08 μm or more and 1.5 μm or less, D90% diameter of 2 μm or more and 4 μm or less, and a BET value of 3 m$^2$/g or more and 20 m$^2$/g or less.

10. The solid electrolyte powder as claimed in claim 9, wherein an average particle diameter of the solid electrolyte powder is 0.05 μm or more and 0.6 μm or less.

11. The solid electrolyte powder as claimed in claim 9, wherein the oxide-based solid electrolyte is phosphoric acid-based solid electrolyte powder.

12. The solid electrolyte powder as claimed in claim 11, wherein the phosphoric acid-based electrolyte powder has a NASICON structure.

13. The all solid battery as claimed in claim 1, wherein the solid electrolyte powder has D10% diameter of 0.05 μm or more and 0.2 μm or less, and a BET value of 3 m$^2$/g or more and 20 m$^2$/g or less.

14. The method as claimed in claim 5, wherein the solid electrolyte powder has D10% diameter of 0.05 μm or more and 0.2 μm or less.

15. The solid electrolyte powder as claimed in claim 9, wherein the solid electrolyte powder has D10% diameter of 0.05 μm or more and 0.2 μm or less.

16. The all solid battery as claimed in claim 1, wherein a thickness of the oxide-based solid electrolyte layer is 10 μm or less.

17. The all solid battery as claimed in claim 1, wherein a surface roughness Ra of the oxide-based solid electrolyte layer is 80 nm or less.

18. The all solid battery as claimed in claim 1, wherein the solid electrolyte powder is $Li_{1+x}Al_xZr_{2-x}(PO_4)_3$ or $Li_{1+x}Al_xTi_{2-x}(PO_4)_3$.

19. The method as claimed in claim 5, wherein the solid electrolyte powder is $Li_{1+x}Al_xZr_{2-x}(PO_4)_3$ or $Li_{1+x}Al_xTi_{2-x}(PO_4)_3$.

20. The solid electrolyte powder as claimed in claim 9, wherein the oxide-based solid electrolyte is $Li_{1+x}Al_xZr_{2-x}(PO_4)_3$ or $Li_{1+x}Al_xTi_{2-x}(PO_4)_3$.

* * * * *